United States Patent
Kurihara

(10) Patent No.: US 8,136,398 B2
(45) Date of Patent: Mar. 20, 2012

(54) VIBRATION GYRO SENSOR, CONTROL CIRCUIT, AND ELECTRONIC APPARATUS

(75) Inventor: Kazuo Kurihara, Miyagi (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 11/970,027

(22) Filed: Jan. 7, 2008

(65) Prior Publication Data

US 2008/0163684 A1    Jul. 10, 2008

(30) Foreign Application Priority Data

Jan. 9, 2007  (JP) ................. 2007-001031

(51) Int. Cl.
  *G01P 9/04* (2006.01)
(52) U.S. Cl. .............. 73/504.12; 73/504.15
(58) Field of Classification Search ........ 73/504.12, 73/504.14, 504.15, 504.16, 504.04
  See application file for complete search history.

(56) References Cited

U.S. PATENT DOCUMENTS

| | | | | |
|---|---|---|---|---|
| 5,270,607 A | * | 12/1993 | Terajima | 310/316.01 |
| 5,336,960 A | * | 8/1994 | Shimizu et al. | 310/369 |
| 5,505,085 A | * | 4/1996 | Kasanami et al. | 73/504.14 |
| 5,794,080 A | * | 8/1998 | Watanabe et al. | 396/53 |
| 5,796,000 A | * | 8/1998 | Fujiu et al. | 73/504.15 |
| 6,016,698 A | * | 1/2000 | Kasanami et al. | 73/504.14 |
| 6,158,281 A | * | 12/2000 | Ebara et al. | 73/504.12 |
| 6,161,432 A | * | 12/2000 | Kasanami et al. | 73/504.14 |
| 6,223,597 B1 | * | 5/2001 | Watarai | 73/504.16 |
| 6,267,008 B1 | * | 7/2001 | Nagao | 73/504.12 |
| 6,508,123 B2 | * | 1/2003 | Hasegawa et al. | 73/504.12 |
| 6,564,638 B1 | * | 5/2003 | Ebara | 73/504.14 |
| 2005/0097954 A1 | * | 5/2005 | Kawamura et al. | 73/504.02 |
| 2005/0115318 A1 | * | 6/2005 | Kawamura et al. | 73/504.12 |
| 2005/0146618 A1 | * | 7/2005 | Matsunaga et al. | 348/208.1 |
| 2005/0188766 A1 | * | 9/2005 | Matsunaga et al. | 73/504.14 |

FOREIGN PATENT DOCUMENTS

| | | |
|---|---|---|
| JP | 03-172714 | 7/1991 |
| JP | 07-139952 | 6/1995 |
| JP | 2000-205861 | 7/2000 |

* cited by examiner

*Primary Examiner* — Helen C. Kwok
(74) *Attorney, Agent, or Firm* — SNR Denton US LLP

(57) ABSTRACT

Provided is a vibration gyro sensor including: a vibration element including a piezoelectric element group which has a first side provided with a drive electrode and a detection electrode and a second side opposed to the first side and provided with a common electrode, which vibrates by a drive signal input between the drive electrode and the common electrode and generates an output signal containing a detection signal corresponding to Coriolis force from the detection electrode; a bias section applying a bias voltage to the detection electrode; an oscillation circuit outputting the signal for causing vibration of the vibration element to the drive electrode as the drive signal based on the output signal generated by the detection electrode; and a phase inversion circuit outputting an inversion signal obtained by inverting a phase of the drive signal output from the oscillation circuit to the common electrode.

7 Claims, 16 Drawing Sheets

VIBRATION GYRO SENSOR, CONTROL CIRCUIT, AND ELECTRONIC APPARATUS

CROSS REFERENCES TO RELATED APPLICATIONS

The present invention contains subject matter related to Japanese Patent Application JP 2007-001031 filed in the Japanese Patent Office on Jan. 9, 2007, the entire contents of which being incorporated herein by reference.

BACKGROUND OF THE INVENTION

1. Field of the Invention

The present invention relates to a vibration gyro sensor for detecting an angular velocity of an object, a control circuit therefor, and an electronic apparatus mounted with the vibration gyro sensor.

2. Description of the Related Art

Up to now, so-called vibration gyro sensors have been widely used as angular velocity sensors for consumer use. The vibration gyro sensors are sensors that detect angular velocities by allowing a cantilever vibrator to vibrate at a predetermined resonance frequency and detecting Coriolis force generated due to an influence of the angular velocity by a piezoelectric element or the like.

The vibration gyro sensors have advantages in that the sensors have a simple mechanism, requires short time to activate, and can be manufactured at low costs. The vibration gyro sensors are mounted to, for example, electronic apparatuses such as a video camera, a virtual reality apparatus, and a car navigation system, and are used as sensors in shake detection, movement detection, and direction detection, respectively.

In recent years, the vibration gyro sensors are required to be downsized and improved in performance due to the downsizing and improvement in performance of the electronic apparatuses to which the vibration gyro sensors are mounted. For example, because of multi-functionalization of the electronic apparatuses, demands are made to mount the vibration gyro sensor to a substrate in combination with various sensors for other purposes, thereby reducing a size thereof. A generally-used technique for realizing such reduction in size is called MEMS (Micro Electro Mechanical System) which involves using an Si substrate and forming a structural body using a thin-film process and a photolithography technique used in forming semiconductors.

Incidentally, a vibration system becomes light along with the downsizing of the vibration gyro sensor. However, because the Coriolis force is proportional to the weight of the vibration system, detection sensitivity deteriorates that much. Further, because an amplitude of the vibrator becomes small when a power supply voltage is decreased due to the downsizing of the vibration gyro sensor, the detection sensitivity also deteriorates thereby. An S/N of a detection output signal is degraded by the deterioration of the detection sensitivity.

Thus, to solve the problems as described above, there is disclosed a technique in which drive signals having the same phase and amplitude and output from two detection electrodes are added in an addition circuit and the signal whose phase has been inverted in an inversion circuit is input to the two detection electrodes (see, for example, Japanese Patent Application Laid-open No. 2000-205861 (paragraphs (0005) and (0016), and FIG. 1)).

SUMMARY OF THE INVENTION

However, recently, further downsizing and reduction in voltage of a vibration gyro sensor are required. Therefore, there is a need to further improve sensor detection sensitivity and a need for a higher S/N than ever before.

In view of the above-mentioned circumstances, there is a need for a vibration gyro sensor capable of improving detection sensitivity and realizing a high S/N, a control circuit therefor, and an electronic apparatus mounted with the vibration gyro sensor.

According to an embodiment of the present invention, there is provided a vibration gyro sensor including a vibration element, bias means, an oscillation circuit, and a phase inversion circuit. The vibration element includes a piezoelectric element group which has a first side provided with a drive electrode and a detection electrode and a second side opposed to the first side and provided with a common electrode, vibrates by a drive signal input between the drive electrode and the common electrode, and can generate an output signal containing a detection signal corresponding to Coriolis force from the detection electrode. The bias means applies a bias voltage to the detection electrode. The oscillation circuit outputs the signal for causing vibration of the vibration element to the drive electrode as the drive signal based on the output signal generated by the detection electrode. The phase inversion circuit outputs an inversion signal obtained by inverting a phase of the drive signal output from the oscillation circuit to the common electrode.

In the embodiment of the present invention, a bias voltage is applied to the detection electrode provided on the first side, and the drive signal can be input between the drive electrode provided on the first side and the common electrode provided on the second side in that state. Accordingly, the vibration element operates so that the drive signal corresponding to the bias voltage is input between the common electrode and the detection electrode. In other words, the detection electrode also functions as the drive electrode. As a result, the detection sensitivity of the detection electrode can be further enhanced to realize a high S/N.

The piezoelectric element group is an element constituted by a plurality of piezoelectric elements. A piezoelectric element is provided for each electrode of the drive electrode and the detection electrode. The vibration element vibrates by the driving of the piezoelectric element provided with the drive electrode among those piezoelectric elements.

According to the embodiment of the present invention, the detection electrode includes a first detection electrode generating a first signal and a second detection electrode generating a second signal for obtaining the detection signal based on a difference between the first signal and the second signal, and the vibration gyro sensor further includes an addition circuit adding the first signal obtained from the first detection electrode and the second signal obtained from the second detection electrode. In other words, the vibration gyro sensor according to the embodiment of the present invention causes self-excited oscillation by the oscillation circuit using the addition signal obtained by the addition in the addition circuit.

According to the embodiment of the present invention, the vibration element includes an insulation body having a conductive film serving as the common electrode of the piezoelectric element group. In other words, the insulation body to which the conductive film has been formed becomes a base vibration body of the vibration element. For example, the vibration element is produced such that the piezoelectric element group is mounted on the conductive film of the insulation body to which the conductive film has been formed.

According to another embodiment of the present invention, there is provided a vibration gyro sensor including a vibration element, bias means, an oscillation circuit, and a phase inversion circuit. The vibration element includes a piezoelectric element which has a first side provided with a drive electrode and detection electrodes and a second side opposed to the first side and provided with a common electrode, vibrates by a drive signal input between the drive electrode and the common electrode, and can generate output signals containing detection signals corresponding to Coriolis force from the detection electrodes. The bias means applies a bias voltage to the detection electrodes. The oscillation circuit outputs the signal for causing vibration of the vibration element to the drive electrode as the drive signal based on the output signals generated by the detection electrodes. The phase inversion circuit outputs an inversion signal obtained by inverting a phase of the drive signal output from the oscillation circuit to the common electrode.

According to the embodiments of the present invention, regarding the piezoelectric element included in the vibration element, the drive electrode and the detection electrodes are formed of the same piezoelectric material.

According to the another embodiment of the present invention, the vibration element includes a vibration arm to which the piezoelectric element is mounted, and a base body having a lead electrode group for external connection of the drive electrode and the detection electrodes and which supports the vibration arm. Accordingly, a plurality of vibration elements can be produced on a single substrate by an MEMS method, for example.

According to still another embodiment of the present invention, there is provided a control circuit including bias means, an oscillation circuit, and a phase inversion circuit. The bias means applies a bias voltage to a detection electrode of a vibration element including a piezoelectric element group which has a first side provided with a drive electrode and the detection electrode and a second side opposed to the first side and provided with a common electrode, which vibrates by a drive signal input between the drive electrode and the common electrode and can generate an output signal containing a detection signal corresponding to Coriolis force from the detection electrode. The oscillation circuit outputs the signal for causing vibration of the vibration element to the drive electrode as the drive signal based on the output signal generated by the detection electrode. The phase inversion circuit outputs an inversion signal obtained by inverting a phase of the drive signal output from the oscillation circuit to the common electrode.

According to yet another embodiment of the present invention, there is provided a control circuit including bias means, an oscillation circuit, and a phase inversion circuit. The bias means applies a bias voltage to detection electrodes of a vibration element including a piezoelectric element which has a first side provided with a drive electrode and the detection electrodes and a second side opposed to the first side and provided with a common electrode, which vibrates by a drive signal input between the drive electrode and the common electrode and can generate output signals containing detection signals corresponding to Coriolis force from the detection electrodes. The oscillation circuit outputs the signal for causing vibration of the vibration element to the drive electrode as the drive signal based on the output signals generated by the detection electrodes. The phase inversion circuit outputs an inversion signal obtained by inverting a phase of the drive signal output from the oscillation circuit to the common electrode.

According to yet still another embodiment of the present invention, there is provided an electronic apparatus including a vibration gyro sensor and a main body to which the vibration gyro sensor is mounted. The vibration gyro sensor includes: a vibration element including a piezoelectric element group which has a first side provided with a drive electrode and a detection electrode and a second side opposed to the first side and provided with a common electrode, which vibrates by a drive signal input between the drive electrode and the common electrode and can generate an output signal containing a detection signal corresponding to Coriolis force from the detection electrode; bias means applying a bias voltage to the detection electrode; an oscillation circuit outputting the signal for causing vibration of the vibration element to the drive electrode as the drive signal based on the output signal generated by the detection electrode; and a phase inversion circuit outputting an inversion signal obtained by inverting a phase of the drive signal output from the oscillation circuit to the common electrode.

As described above, according to the embodiments of the present invention, it is possible to improve detection sensitivity of the vibration gyro sensor and to realize a high S/N.

These and other objects, features and advantages of the present invention will become more apparent in light of the following detailed description of best mode embodiments thereof, as illustrated in the accompanying drawings.

DESCRIPTION OF PREFERRED EMBODIMENTS

Prior to giving descriptions on a vibration gyro sensor according to embodiments of the present invention, a principle of the vibration gyro sensor will first be described with reference to the drawings.

Figure 1A:
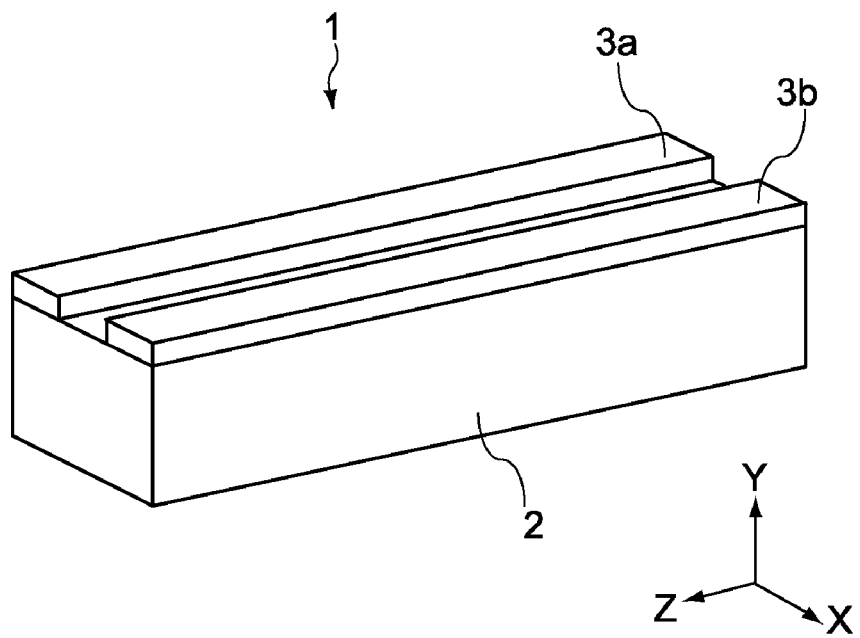
FIG. 1A is a perspective view of a vibration gyro element.
Figure 1B:
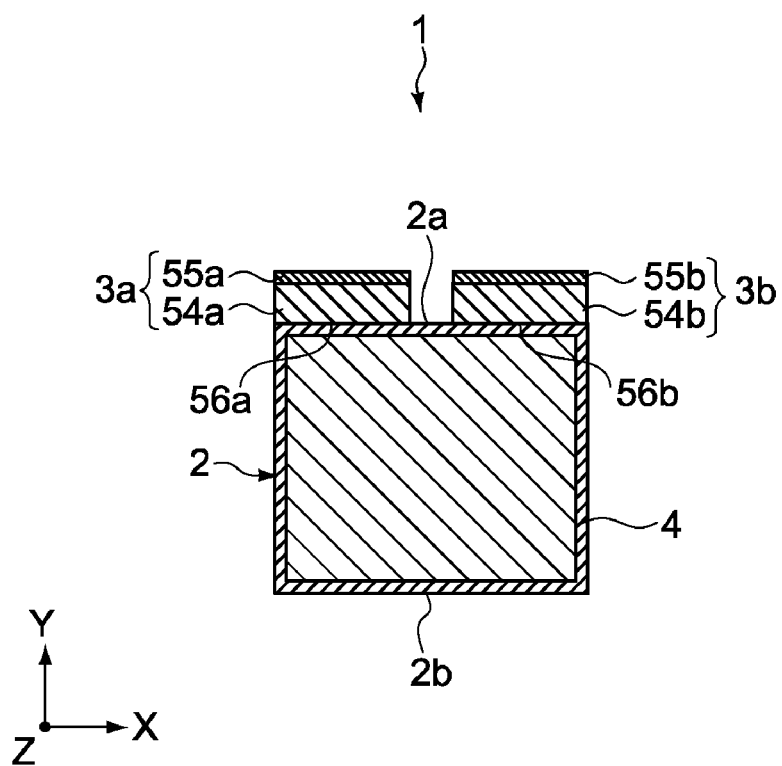
FIG. 1B is a sectional view of a surface perpendicular to an axis in a longitudinal direction in the vibration gyro element.

FIG. 1A is a perspective view of a vibration gyro element, and FIG. 1B is a sectional view of a surface perpendicular to an axis in a longitudinal direction in the vibration gyro element.

A vibration gyro element 1 includes a base vibration body 2 of a quadrangular prism shape, whose surface is conductively plated, a piezoelectric element 3a, and a piezoelectric element 3b. The piezoelectric elements 3a and 3b are formed so as to be aligned on a first side surface 2a of the base vibration body 2. The piezoelectric element 3a includes a piezoelectric body 54a and an electrode 55a formed on a surface of the piezoelectric body 54a. In a similar manner, the piezoelectric element 3b includes a piezoelectric body 54b and an electrode 55b formed on a surface of the piezoelectric body 54b. A conductive plating 4 serves as a common electrode of the piezoelectric elements 3a and 3b.

Figure 2:
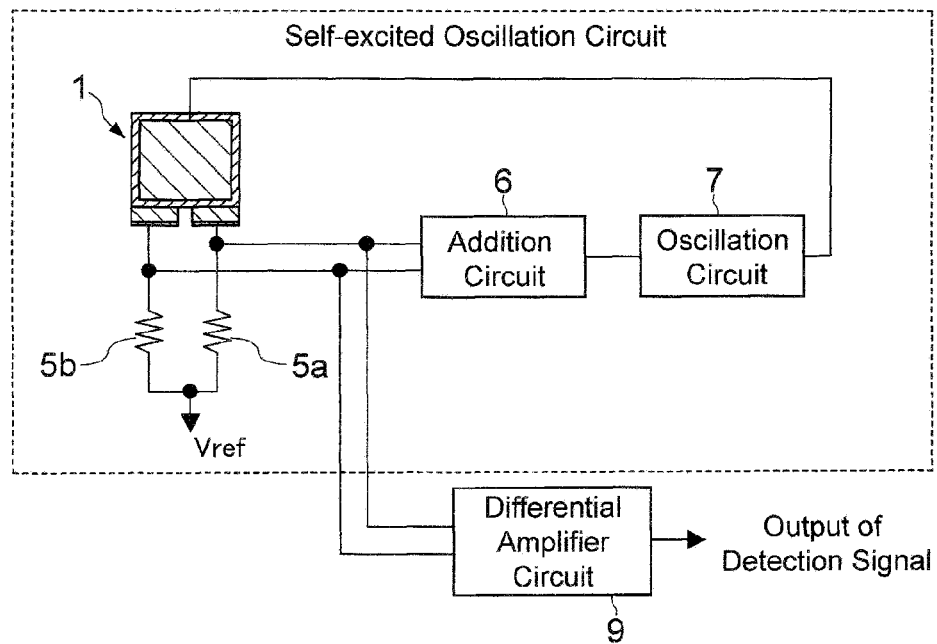
FIG. 2 is a circuit block diagram of a gyro sensor including the vibration gyro element shown in FIG. 1.

FIG. 2 is a circuit block diagram of the gyro sensor including the vibration gyro element 1 shown in FIG. 1. An output of an oscillation circuit 7 is input as a drive signal to a second side surface 2b opposed to the first side surface 2a of the base vibration body 2 (see FIG. 1B). The drive signal passes through the common electrode (reference electrode) 4 of the base vibration body 2 and is input to side surfaces 56a and 56b of the piezoelectric elements 3a and 3b that are in contact with the common electrode 4. The drive signal is the same in phase and magnitude in the piezoelectric elements 3a and 3b. Signals output from the electrodes 55a and 55b of the piezoelectric elements 3a and 3b are respectively input to resistors 5a and 5b and to an addition circuit 6. The resistors 5a and 5b are resistors for applying a bias voltage Vref to the output signals of the piezoelectric elements 3a and 3b. An output of the addition circuit 6 is input to the oscillation circuit 7. The outputs of the piezoelectric elements 3a and 3b are input to a differential amplifier circuit 9.

The vibration gyro element 1, the addition circuit 6, and the oscillation circuit 7 constitute a self-excited oscillation circuit. The vibration gyro element 1 oscillates by the self-excited oscillation circuit and bends and vibrates in a direction perpendicular to the first side surface 2a and the second side surface 2b of the base vibration body 2 (Y-axis direction). The entire vibration gyro element 1 bends and vibrates along with the bending vibration of the piezoelectric elements 3a and 3b. When the vibration gyro element 1 rotates in this state with an axis in the longitudinal direction (Z-axis) (hereinafter, referred to as longitudinal axis) as a center, Coriolis force is generated in the vibration gyro element 1 and a direction of the bending vibration changes. Thus, an output difference is generated between the piezoelectric elements 3a and 3b, thereby obtaining an output from the differential amplifier circuit 9. As described above, the drive signals for driving the vibration gyro element 1 are signals that are the same in phase and magnitude in the piezoelectric elements 3a and 3b. Accordingly, the drive signals are canceled out in the differential amplifier circuit 9 and a signal corresponding to a level of angular velocity is output from the differential amplifier circuit 9.

As described above, the piezoelectric elements 3a and 3b are used as a drive piece for causing bending vibration of the base vibration body 2 and also as a detection piece for obtaining a signal corresponding to the angular velocity.

Figure 3:
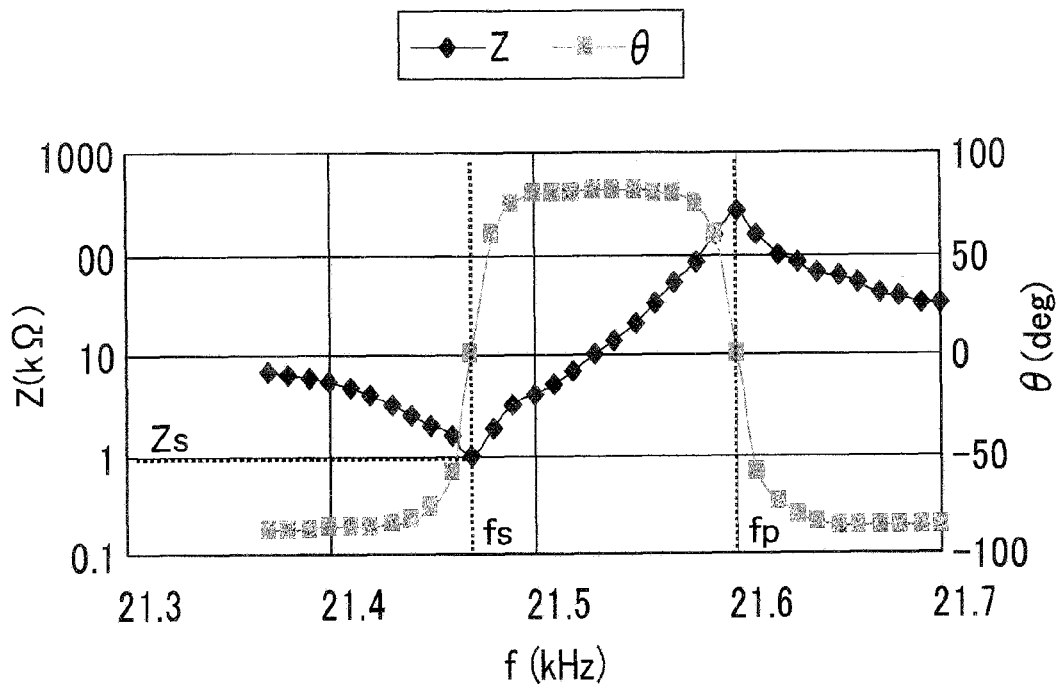
FIG. 3 is a graph showing impedance characteristics of the vibration gyro element.

FIG. 3 is a graph showing impedance characteristics of the vibration gyro element 1. The abscissa axis represents a resonance frequency and the ordinate axes represent an impedance Z and phase θ of the piezoelectric element 3a or 3b, respectively. The impedance becomes a minimum value Zs and the phase becomes 0 (deg) at a frequency fs. The frequency fs is a series resonance point. Further, the impedance becomes maximum and the phase becomes 0 (deg) at a frequency fp. The frequency fp is a parallel resonance point. The gyro sensor shown in FIG. 2 is caused to oscillate at the series resonance point by the self-excited oscillation circuit constituted by the vibration gyro element 1, the addition circuit 6, and the oscillation circuit 7.

Figure 4:
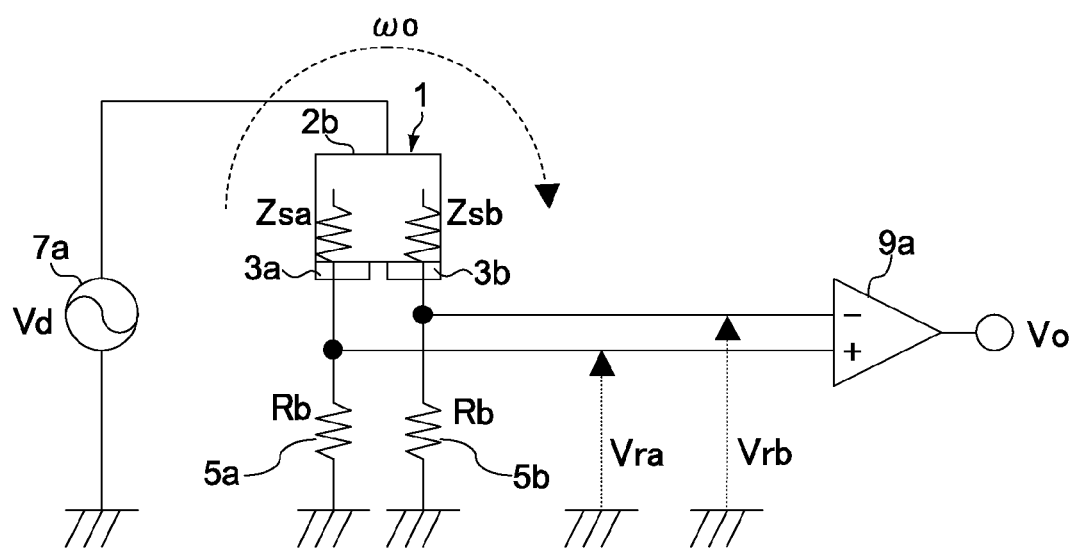
FIG. 4 is a diagram showing an equivalence circuit of the gyro sensor shown in FIG. 2.

FIG. 4 is a diagram showing an equivalence circuit of the gyro sensor shown in FIG. 2. An operation principle of the gyro sensor shown in FIG. 2 will be described more specifically with reference to FIG. 4. An output of an oscillator 7a is input as a drive signal to the second side surface 2b of the base vibration body 2. The drive signal passes through the common electrode 4 of the base vibration body 2 and is input to the side surfaces of the piezoelectric elements 3a and 3b that are in contact with the common electrode 4. Signals output from the electrodes 55a and 55b of the piezoelectric elements 3a and 3b are respectively input to the resistors 5a and 5b and also to the differential amplifier circuit 9a.

The vibration gyro element 1 is caused of separately-excited oscillation by an alternating voltage signal Vd input by the oscillator 7a. At this time, an impedance Zsa of the piezoelectric element 3a and an impedance Zsb of the piezoelectric element 3b of the vibration gyro element 1 become minimum. In addition, an alternating voltage signal Vra across both ends of the resistor 5a and an alternating voltage signal Vrb across both ends of the resistor 5b become maximum.

When an angular velocity ωo of the vibration gyro element 1 with the longitudinal axis as the center is not imparted, the impedance Zsa and the impedance Zsb become the same level Zs, and the Vra and Vrb also become the same signal. Therefore, the output of the differential amplifier circuit 9a becomes 0. The amplitude of the alternating voltage signal across both ends of each of the piezoelectric elements 3a and 3b at this time is represented by Ag.

When the angular velocity ωo with the longitudinal axis as the center is imparted to the vibration gyro element 1, a detection signal corresponding to the Coriolis force appears in the output of the differential amplifier circuit 9a. When a mass of the vibration gyro element is represented by m, the magnitude Vo of the detection signal can be expressed by Expression (1).

$$Vo \propto m*Ag*\omega o \tag{1}$$

A resistance Rb of the resistors 5a and 5b is smaller the better in view of drive efficiency. This is because, since the alternating voltage signal Vd is divided by the impedance Zs (Zsa, Zsb) and the resistance Rb, the amplitude Ag increases when the resistance Rb becomes smaller. However, the resistance Rb is larger the better in view of detection efficiency. Specifically, this is because a difference between the impedance Zsa and the impedance Zsb generated by the angular velocity ωo appears as a difference in voltage across both ends between the resistors 5a and 5b.

In view of the above, the value of the resistors 5a and 5b with which the detection signal becomes maximum can be obtained when Rb=Zs. This is because as described above, the piezoelectric elements 3a and 3b both function as the drive piece and the detection piece.

In a case where the values of the resistors 5a and 5b are selected to be Rb=Zs, to increase the magnitude of the detection signal with respect to a certain angular velocity ωo, as is apparent from Expression (1), it is only necessary to increase the mass m of the vibration gyro element 1 or increase the amplitude Ag of the alternating voltage signal across both ends of the piezoelectric elements 3a and 3b. However, it may be difficult to increase the mass m in a gyro sensor that is required to be downsized. Thus, attempts are made to increase the amplitude Ag. For increasing the amplitude Ag, it is only necessary to increase the amplitude of the alternating voltage signal Vd input by the oscillator 7a. However, the maximum amplitude of the signal Vd is determined by the level of the power supply voltage of the gyro sensor, whereby it may be difficult to increase the power supply voltage under the circumstance that low power consumption is required.

Figure 5:
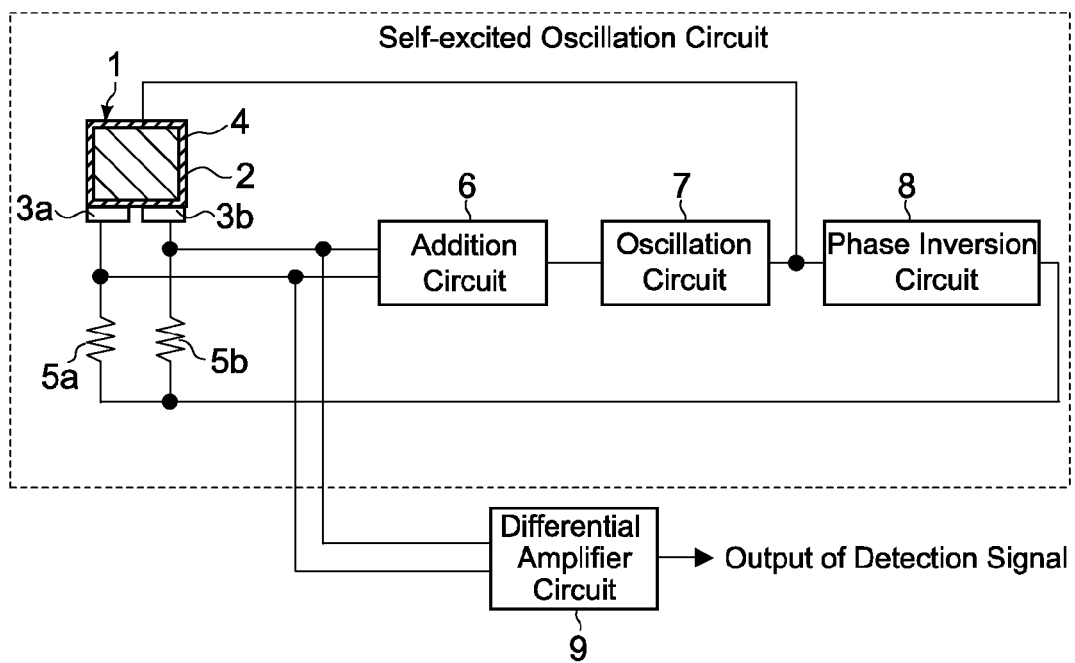
FIG. 5 is a circuit block diagram showing a structure of a gyro sensor provided with a phase inversion circuit.

Thus, as shown in FIG. 5, there is proposed a gyro sensor provided with a phase inversion circuit 8. The output of the oscillation circuit 7 is input to the common electrode 4 of the base vibration body 2 and to the phase inversion circuit 8. The output of the phase inversion circuit 8 passes through the resistors 5a and 5b to be input to the surfaces of the piezoelectric elements 3a and 3b opposed to the side surface in contact with the base vibration body 2, that is, the electrodes 55a and 55b.

Figure 6:
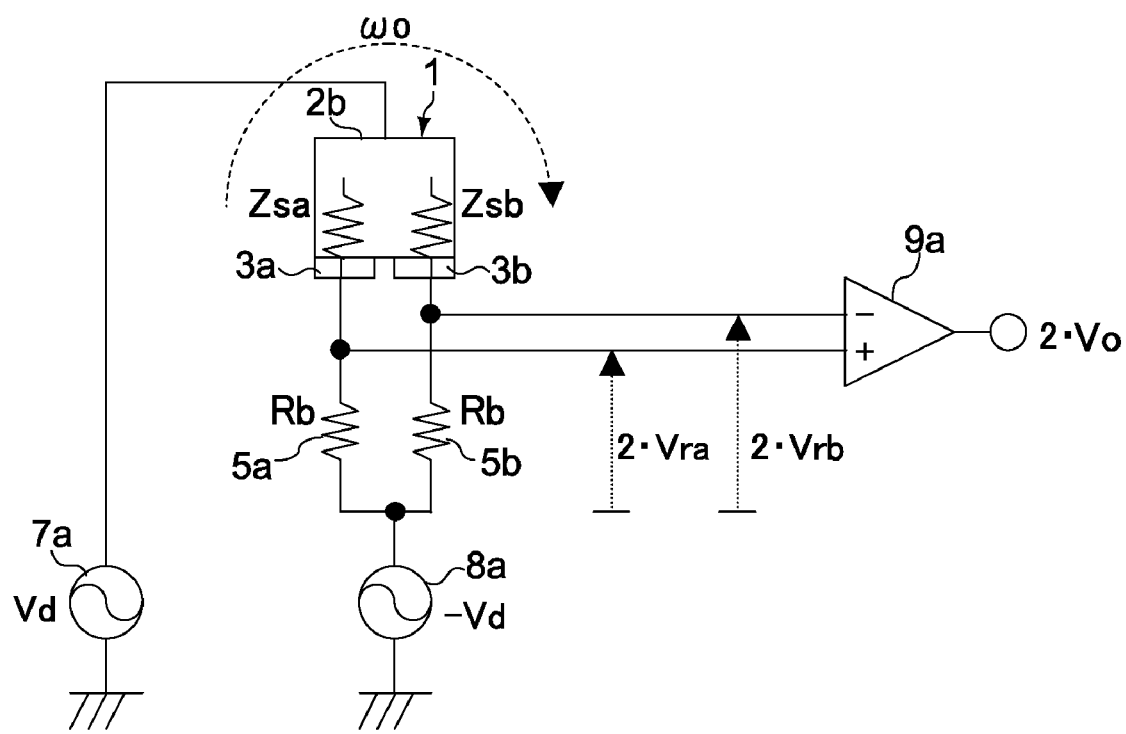
FIG. 6 is a diagram showing an equivalence circuit of the gyro sensor shown in FIG. 5.

FIG. 6 is a diagram showing an equivalence circuit of the gyro sensor shown in FIG. 5. The diagram of FIG. 6 is different from the circuit block diagram of FIG. 4 in that an output of an oscillator 8a is input to the resistors 5a and 5b. The alternating voltage signal −Vd input by the oscillator 8a is a signal of the same magnitude as the alternating voltage signal Vd input by the oscillator 7a but with an inverse phase.

The vibration gyro element 1 is caused of the separately-excited oscillation by the alternating voltage signals Vd and −Vd input by the oscillators 7a and 8a. Upon the separately-excited oscillation, the impedance Zsa of the piezoelectric element 3a and the impedance Zsb of the piezoelectric element 3b of the vibration gyro element 1 become minimum. When the angular velocity ωo with the longitudinal axis of the vibration gyro element 1 as the center is not imparted, the impedance Zsa and the impedance Zsb become the same level Zs. The amplitude of the alternating voltage signal across both ends of the piezoelectric elements 3a and 3b is determined by a difference 2*Vd between the alternating voltage signals Vd and −Vd being divided by the impedance Zs and the resistance Rb, which is 2*Ag. Further, the alternating voltage signal across both ends of the resistor 5a becomes 2*Vra and the alternating voltage signal across both ends of the resistor 5b becomes 2*Vrb, which are the same signal.

When the angular velocity ωo with the longitudinal axis as the center is imparted to the vibration gyro element 1, the impedance Zsa and the impedance Zsb are changed in level. As a result, there is caused a difference between the alternating voltage signal 2*Vra across both ends of the resistor 5a and the alternating voltage signal 2*Vrb across both ends of the resistor 5b, whereby a detection signal corresponding to the Coriolis force appears in the output of the differential amplifier circuit 9a. The magnitude of the detection signal is represented by Expression (2), which is twice as that represented by Expression (1).

$$2*Vo \approx 2*m*Ag*\omega o \qquad (2)$$

Therefore, by providing two oscillators and driving the vibration gyro element 1 by the differential, the detection signal can be doubled without increasing the amplitude of the alternating voltage signals of the oscillators 7a and 8a.

Figure 7A:
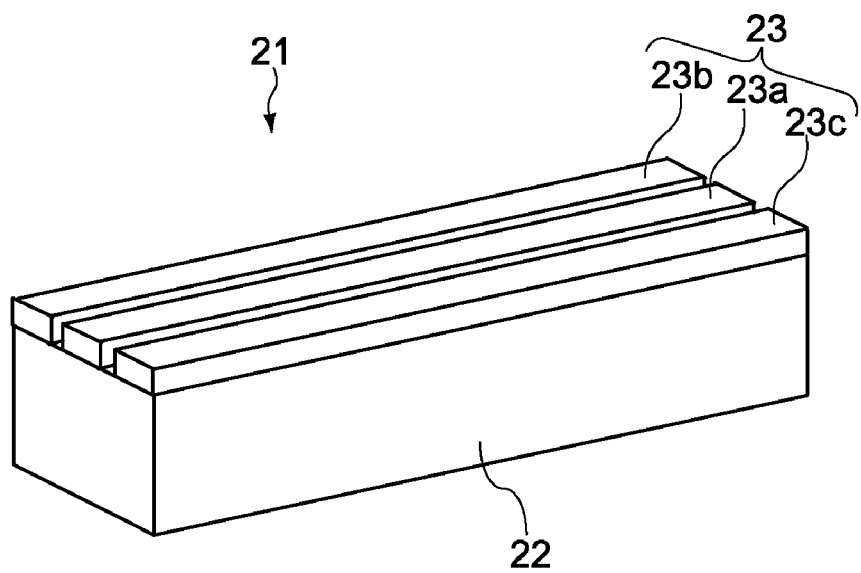
FIG. 7A is a view of a vibration element of a vibration gyro sensor according to an embodiment of the present invention.
Figure 7B:
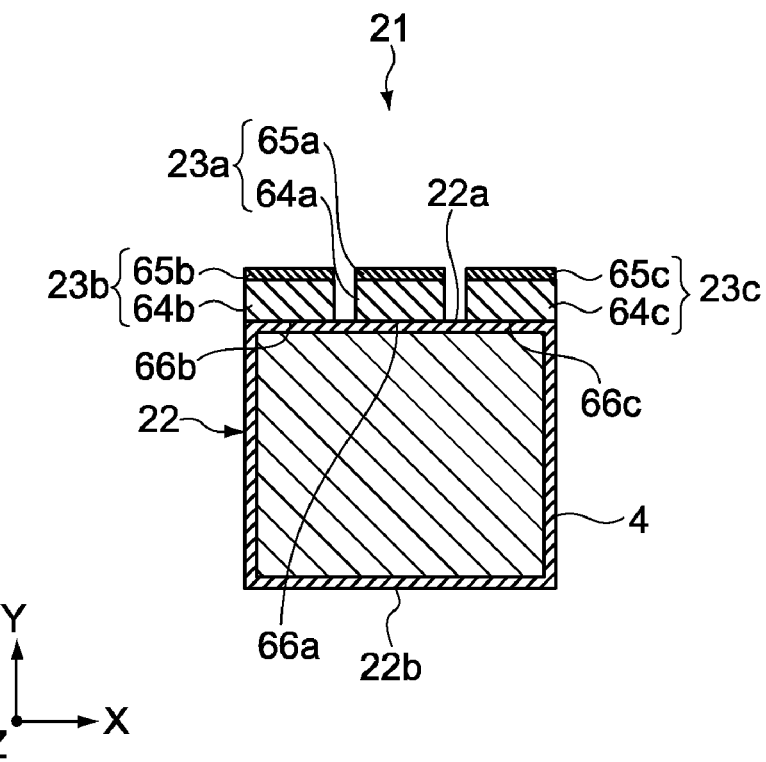
FIG. 7B is a sectional view thereof.

FIG. 7A shows a vibration element of a vibration gyro sensor according to an embodiment of the present invention, and FIG. 7B is a sectional view thereof.

The vibration element includes a base vibration body 22 and a piezoelectric element group 23 provided to the base vibration body 22. The base vibration body 22 is an insulation body or a piezoelectric body having a common electrode 4 that has been conductively plated, for example. Examples of the method of plating include electroplating, electroless plating, deposition, and sputtering. Examples of the insulation body include quartz, glass, crystal, and ceramics, or other insulation bodies. Examples of the piezoelectric body include barium titanate, lead zirconate titanate, lithium niobate, and lithium tantalate, or other piezoelectric bodies. It is only necessary that a piezoelectric material similar in the case of the base vibration body 22 be used as a piezoelectric material of the piezoelectric element group 23. Alternatively, the base vibration body 22 may be a semiconductor or a conductor. In the case of the conductor, nickel, iron, chromium, titanium, or an alloy thereof is used, for example. As the alloy, elinvar or nickel-iron alloy is used, for example. When the base vibration body 22 is formed by a conductor, the entire base vibration body 22 serves as the common electrode (reference electrode) having a common reference potential.

The piezoelectric element group 23 is constituted by a first piezoelectric element 23a, a second piezoelectric element 23b, and a third piezoelectric element 23c. The first piezoelectric element 23a is a piezoelectric element for driving the vibration element 21 and has a drive electrode 65a provided on a first side thereof. In the piezoelectric element group 23, the first side refers to a side opposed to the side of the base vibration body 22. Hereinafter, the side opposed to the side on which the base vibration body 22 is provided will be referred to as first side also with respect to the second piezoelectric element 23b and the third piezoelectric element 23c.

The second piezoelectric element 23b and the third piezoelectric element 23c are provided so as to sandwich the first piezoelectric element 23a. The second piezoelectric element 23b and the third piezoelectric element 23c are piezoelectric elements for detecting the angular velocity and respectively have detection electrodes 65b and 65c on the first side thereof.

A second side of the piezoelectric element group 23 opposed to the first side is in contact with the common electrode 4. In other words, the second side of each of the first piezoelectric element 23a, the second piezoelectric element 23b, and the third piezoelectric element 23c (bottom surfaces 66a, 66b, and 66c of the piezoelectric element group 23) is in contact with the common electrode 4.

Figure 8:
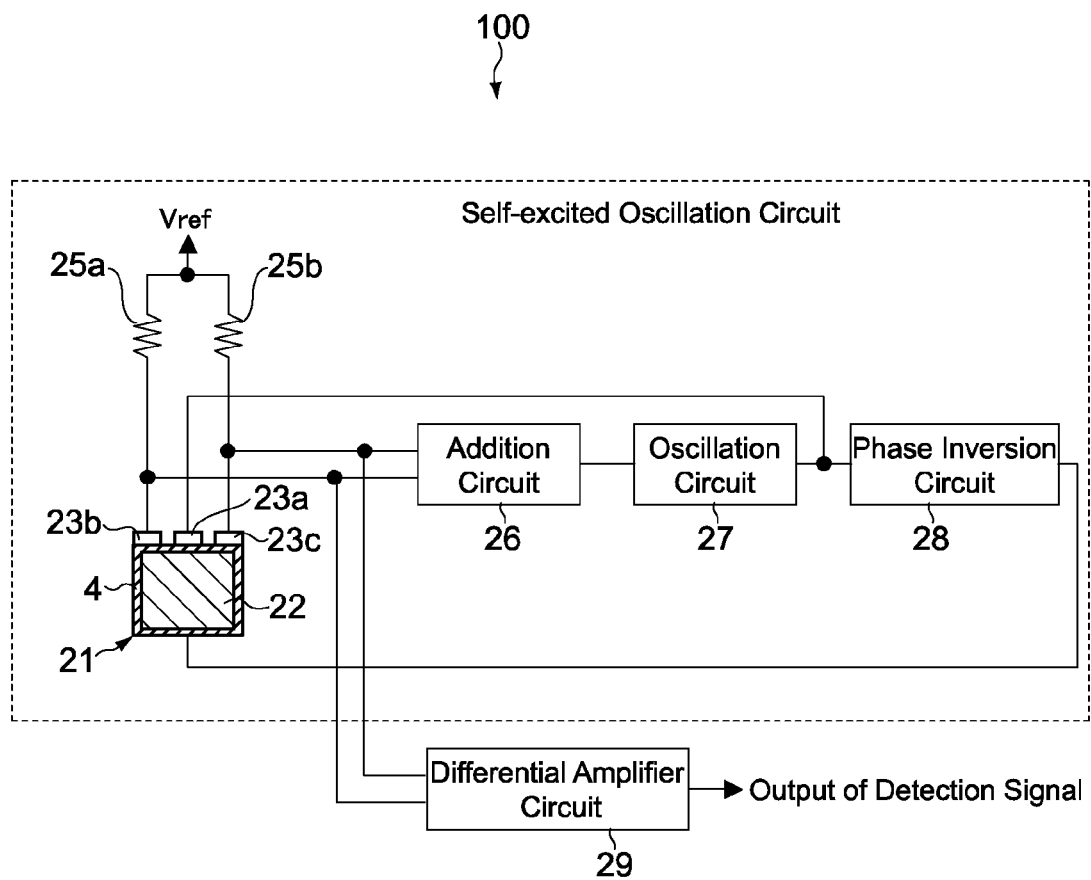
FIG. 8 is a circuit block diagram showing a structure of the vibration gyro sensor including the vibration element shown in FIG. 7.

FIG. 8 is a circuit block diagram showing a structure of a vibration gyro sensor including the vibration element 21 shown in FIG. 7. A vibration gyro sensor 100 includes an addition circuit 26, an oscillation circuit 27, a phase inversion circuit 28, a differential amplifier circuit 29, and resistors 25 (25a and 25b) as bias means. The addition circuit 26, the oscillation circuit 27, the phase inversion circuit 28, the differential amplifier circuit 29, and the resistors 25 constitute a control circuit of the vibration gyro sensor 100.

An output signal of the oscillation circuit 27 is input to the drive electrode 65a of the first piezoelectric element 23a and to the phase inversion circuit 28 as a drive signal. The output signal of the phase inversion circuit 28 is input to the common electrode 4. The output signal of the phase inversion circuit 28 is input to the surfaces 66a, 66b, and 66c of the first, second, and third piezoelectric elements 23a, 23b, and 23c that are in contact with the common electrode 4. Outputs from the detection electrodes 65b and 65c of the second and third piezoelectric elements 23b and 23c are respectively input to the resistors 25a and 25b and also to the addition circuit 26. The resistors 25a and 25b are resistors for applying a bias voltage Vref to the output signals. In addition, the outputs of the second and third piezoelectric elements 23b and 23c are input to the differential amplifier circuit 29. Further, the output of the addition circuit 26 is input to the oscillation circuit 27.

Based on the output signal containing the detection signals generated by the detection electrodes 65b and 65c of the second and third piezoelectric elements 23b and 23c, the oscillation circuit 27 outputs a signal for causing self-excited oscillation of the vibration element 21 to the drive electrode 65a of the first piezoelectric element 23a as the drive signal. Specifically, the vibration element 21 oscillates by the self-excited oscillation circuit constituted by the vibration element 21, the addition circuit 26, the oscillation circuit 27, and the phase inversion circuit 28. Accordingly, the vibration element 21 is caused of the bending vibration in a direction perpendicular to a first side surface 22a and a second side surface 22b of the base vibration body 22.

When the vibration element 21 rotates with the longitudinal axis (Z-axis) as the center in this state, Coriolis force is generated in the vibration element 21 and the direction of the bending vibration changes. Thus, an output difference is generated between the second and third piezoelectric elements 23b and 23c, whereby an output can be obtained from the differential amplifier circuit 29. The signals input to the second and third piezoelectric elements 23b and 23c at the time of driving by the self-excited oscillation of the vibration element 21 are the same in phase and magnitude. Therefore, the signals input to the second and third piezoelectric elements 23b and 23c are canceled out in the differential amplifier circuit 29. Specifically, a signal corresponding to the level of the angular velocity ωo is output from the differential amplifier circuit 29.

In the vibration gyro sensor 100 according to this embodiment, the output of the phase inversion circuit 28 is input to the second side of the piezoelectric element group 23 (bottom surfaces 66a, 66b, and 66c) via the common electrode 4. The first piezoelectric element 23a is used as the drive piece for causing bending vibration of the base vibration body 22. Because a bias voltage is applied by the resistors 25a and 25b regarding the second and third piezoelectric elements 23b and 23c, by inputting the output of the phase inversion circuit 28 to the common electrode 4, the second and third piezoelectric elements 23b and 23c are not only used as the detection piece but also as the drive piece.

Figure 9:
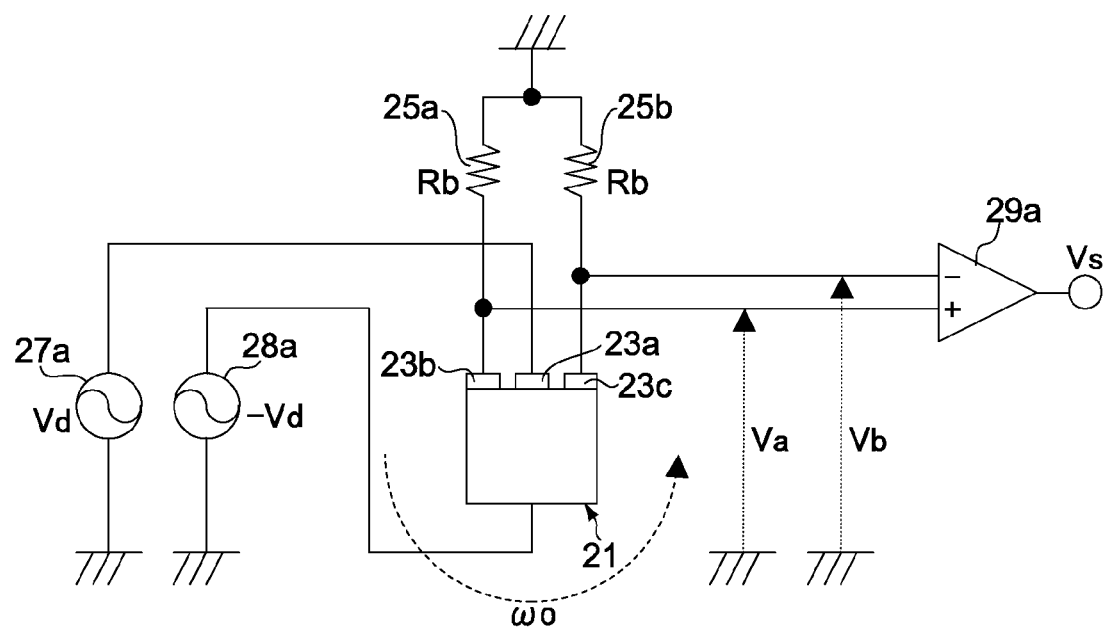
FIG. 9 is a diagram showing an equivalence circuit of the vibration gyro sensor shown in FIG. 8.

FIG. 9 is a diagram showing an equivalence circuit of the vibration gyro sensor 100 shown in FIG. 8. Outputs of the oscillators 27a and 28a are input to the vibration element 21. The base vibration body 22 is caused of the bending vibration in the direction perpendicular to the first side surface 22a and the second side surface 22b of the base vibration body 22 by the alternating voltage signal Vd output by the oscillator 27a being input between the first side and the second side of the first piezoelectric element 23a. An output difference between the signals from the second and third piezoelectric elements 23b and 23c is obtained in the differential amplifier 29a. A signal of the difference is Vs=Va−Vb.

Figure 10:
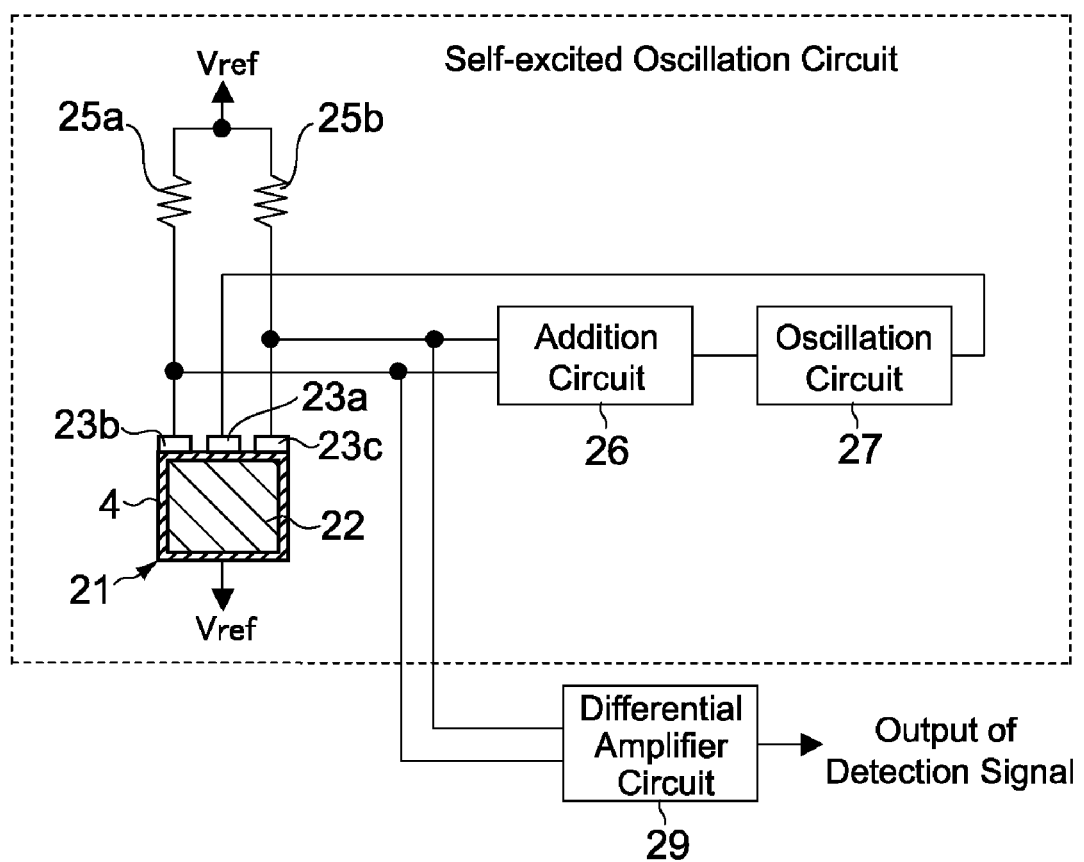
FIG. 10 is a block diagram showing a vibration gyro sensor that is not provided with a phase inversion circuit in FIG. 9.

Here, FIG. 10 is a block diagram showing the vibration gyro sensor that is not provided with the phase inversion circuit in FIG. 9. The second side surface 22b of the base vibration body 22 is connected to the reference potential Vref.

In this example, the first piezoelectric element 23a is used as the drive piece for causing bending vibration of the base vibration body 22, and the second and third piezoelectric elements 23b and 23c are used as the detection piece for obtaining a signal corresponding to the angular velocity.

Figure 11:
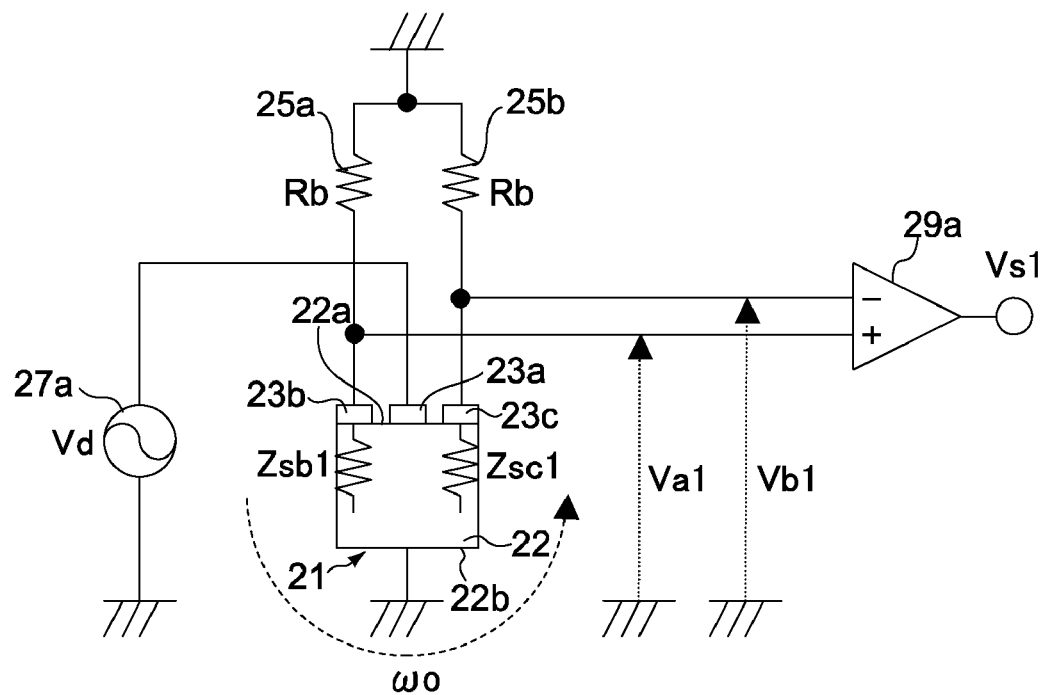
FIG. 11 is a diagram showing an equivalence circuit of the vibration gyro sensor shown in FIG. 10.

FIG. 11 is a diagram showing an equivalence circuit of the vibration gyro sensor shown in FIG. 10. The second side surface 22b of the base vibration body 22 is grounded. Therefore, the sides of the second and third piezoelectric elements 23b and 23c that are in contact with the common electrode 4 (second side) are grounded. The output of the oscillator 27a is input to the drive electrode 65a provided on the first side of the first piezoelectric element 23a. The resistors 25a and 25b are resistors for applying a bias voltage 0 (V) to the signals.

The base vibration body 22 is caused of the bending vibration in the direction perpendicular to the first side surface 22a and the second side surface 22b of the base vibration body 22 by the alternating voltage signal Vd output from the oscillator 27a being input to the first side and the second side of the first piezoelectric element 23a. The vibration is transferred to the second and third piezoelectric elements 23b and 23c to be converted into electric signals for output. At this time, an impedance Zsb1 of the second piezoelectric element 23b and an impedance Zsc1 of the third piezoelectric element 23c become minimum, and the alternating voltage signal Va1 across both ends of the resistor 25a and the alternating voltage signal Vb1 across both ends of the resistor 25b become maximum. In other words, the magnitude of the bending vibration of the base vibration body 22 is proportional to the magnitude of the alternating voltage signals Va1 and Vb1.

When the angular velocity ωo with the longitudinal axis as the center is not imparted to the vibration element 21, the impedance Zsb1 and the impedance Zsc1 become the same level Zs1, and the alternating voltage signals Va1 and Vb1 also become the same signal. Thus, the output of the differential amplifier 29a becomes 0. The amplitude of the alternating voltage signal across both ends of the resistors 25a and 25b at this time is represented by Av1.

When the angular velocity ωo with the longitudinal axis as the center is imparted to the vibration element 21, the base vibration body 22 bends and vibrates in a direction different from that up to that point, and the impedance Zsb1 and the impedance Zsc1 are changed in level. As a result, a difference is caused between the alternating voltage signals Va1 and Vb1, and a detection signal corresponding to the Coriolis force appears in the output of the differential amplifier 29a. Assuming that the mass of the vibration element 21 is represented by m, the magnitude Vs1 of the detection signal can be expressed by Expression (3).

$$Vs1 \propto m*Av1*\omega o \quad (3)$$

Because the second and third piezoelectric elements 23b and 23c are used only as the detection piece, the resistance Rb of the resistors 25a and 25b is larger the better in view of detection efficiency.

Figure 12:
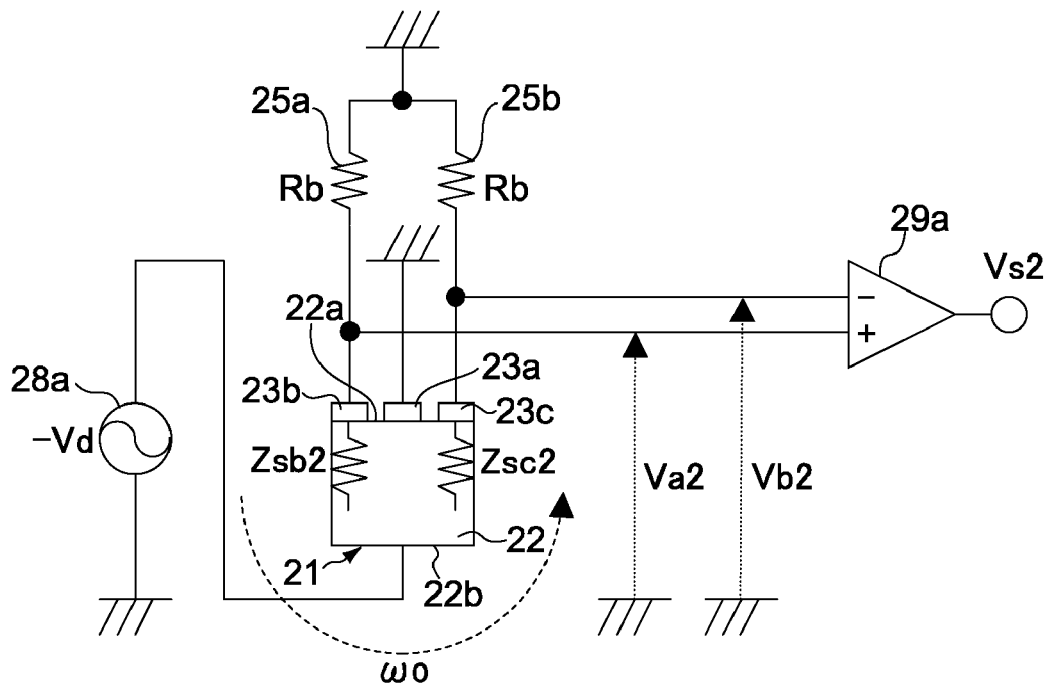
FIG. 12 is a diagram showing an equivalence circuit of another exemplary vibration gyro sensor.

Here, the inventors of the present invention have made a circuit of the vibration gyro sensor shown in FIG. 12 and conducted a measurement on the detection signal from the detection electrodes 65b and 65c (see FIG. 7B). The circuit shown in FIG. 12 is different from that shown in FIG. 11 in that the electrode 65a of the first piezoelectric element 23a in FIG. 10 is grounded and the oscillator 28a is connected to the common electrode 4 on the second side surface 22b of the base vibration body 22. The alternating voltage signal −Vd input by the oscillator 28a is a signal same in magnitude as the alternating voltage signal Vd input by the oscillator 27a of FIG. 11 but with an inverse phase.

By the alternating voltage signal −Vd output by the oscillator 28a being input to both sides of the first piezoelectric element 23a, being input between the second piezoelectric element 23b and the resistor 25a connected in series, and being further input between the third piezoelectric element 23c and the resistor 25b connected in series, the base vibration body 22 is caused of the bending vibration in the direction perpendicular to the first side surface 22a and the second side surface 22b thereof. At this time, the impedance Zsb2 of the second piezoelectric element 23b and the impedance Zsc2 of the third piezoelectric element 23c become minimum. In addition, the alternating voltage signal Va2 across both ends of the resistor 25a and the alternating voltage signal Vb2 across both ends of the resistor 25b become maximum.

When the angular velocity ωo with the longitudinal axis as the center is not imparted to the vibration element 21, the impedance Zsb2 and the impedance Zsc2 become the same level Zs2, and the alternating voltage signals Va2 and Vb2 also become the same signal. Therefore, the output of the differential amplifier 29a becomes 0. The amplitude of the alternating voltage signals of the resistors 25a and 25b at this time is represented by Av2. Results of the actual measurement of the alternating voltage signals Va2 and Vb2 when the resistance Rb of the resistors 25a and 25b is set as the following Expression (4) are as expressed by Expressions (5) to (7). As compared with the alternating voltage signals Va1 and Vb1 in the circuit shown in FIG. 10, the alternating voltage signals Va2 and Vb2 are larger in amplitude and have the same phase.

$$Rb \gg Zs2 \quad (4)$$

$$Va2=1.8*Va1 \quad (5)$$

$$Vb2=1.8*Vb1 \quad (6)$$

$$Va2=Vb2 \quad (7)$$

In addition, the amplitude Av2 of the alternating voltage signal across both ends of the resistors 25a and 25b can be expressed by Expression (8).

$$Av2=1.8*Av1 \quad (8)$$

As described above, as compared with the alternating voltage signals Va1 and Vb1 of the circuit shown in FIG. 10, the reason why the alternating voltage signals Va2 and Vb2 are increased as much as 1.8 times is that not only the first piezoelectric element 23a but also the second and third piezoelectric elements 23b and 23c function as the drive piece. In other words, the second and third piezoelectric elements 23b and 23c each function as both the drive piece and the detection piece.

On the other hand, when the angular velocity ωo with the longitudinal axis as the center is imparted to the vibration element 21, the base vibration body 22 bends and vibrates in a direction different from that up to that point due to the generation of the Coriolis force, and the level of the impedance Zsb2 and impedance Zsc2 changes. As a result, a difference is caused between the alternating voltage signals Va2 and Vb2, and a detection signal corresponding to the Coriolis force appears in the output of the differential amplifier 29a. Assuming that the mass of the vibration element 21 is represented by m, the magnitude Vs2 of the detection signal can be expressed by Expression (9).

$$Vs2 \approx m*Av2*\omega o = 1.8*m*Av1*\omega o \quad (9)$$

Here, returning to the description on the vibration gyro sensor 100 according to the embodiment shown in FIGS. 8 and 9, the circuit of the vibration gyro sensor 100 is structured like a circuit having the circuit shown in FIG. 11 and that shown in FIG. 12 integrated. Specifically, the alternating voltage signal Va of the resistor 25a and the alternating voltage signal Vb of the resistor 25b are obtained by respectively synthesizing the signals Va1 and Vb1 shown in FIG. 11 and the signals Va2 and Vb2 shown in FIG. 12.

When the angular velocity ωo with the longitudinal axis as the center is imparted to the vibration element 21, a detection signal corresponding to the Coriolis force appears in the output of the differential amplifier 29a. Assuming that the mass of the vibration element 21 is represented by m, the magnitude Vs of the detection signal can be expressed by Expression (10).

$$Vs=Vs1+Vs2=2.8*m*Av1*\omega o \quad (10)$$

Specifically, Vs is 2.8 times as large as Av1, whereby the detection sensitivity can be further improved than the circuit merely provided with the phase inversion circuit.

Figure 13:
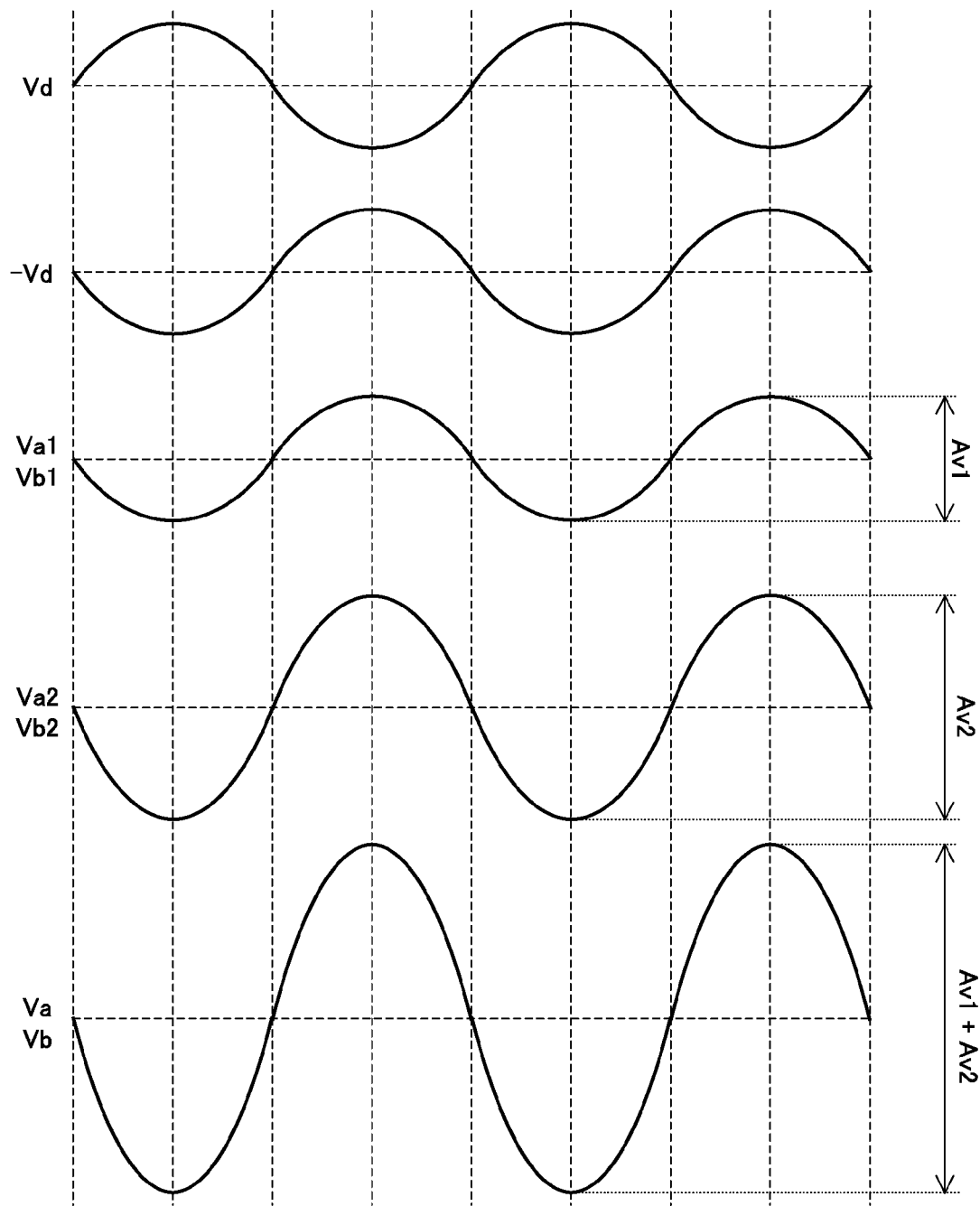
FIG. 13 is a diagram showing a time chart of voltage waveforms of detection electrodes in the circuits shown in FIGS. 9, 11, and 12.

FIG. 13 is a diagram showing a time chart of voltage waveforms of the detection electrodes in the circuits shown in FIGS. 9, 11, and 12. Specifically, the diagram shows the alternating voltage signal Vd input by the oscillator 27a, the alternating voltage signal −Vd input by the oscillator 28a, and the alternating voltage signals Va1, Vb1, Va2, Vb2, Va, and Vb of the resistors 25a and 25b at a time when the angular velocity ωo with the longitudinal axis as the center is not imparted to the vibration element 21.

As described above, according to the vibration gyro sensor 100 according to the embodiment shown in FIGS. 8 and 9, a drive signal can be input between the drive electrode 65a provided on the first side of the first piezoelectric element 23a and the common electrode 4 provided on the second side thereof in a state where a bias voltage is applied to the detection electrodes 65b and 65c. Accordingly, the vibration element 21 operates so that the drive signal corresponding to the bias voltage is input between the common electrode 4 and the detection electrodes 65b and 65c in the second and third piezoelectric elements 23b and 23c. In other words, the second and third piezoelectric elements 23b and 23c as the detection piece also function as the drive piece. As a result, detection sensitivity of the detection electrodes 65b and 65c can be further improved without an increase in power supply voltage, and a high S/N can therefore be realized.

Figure 14A:
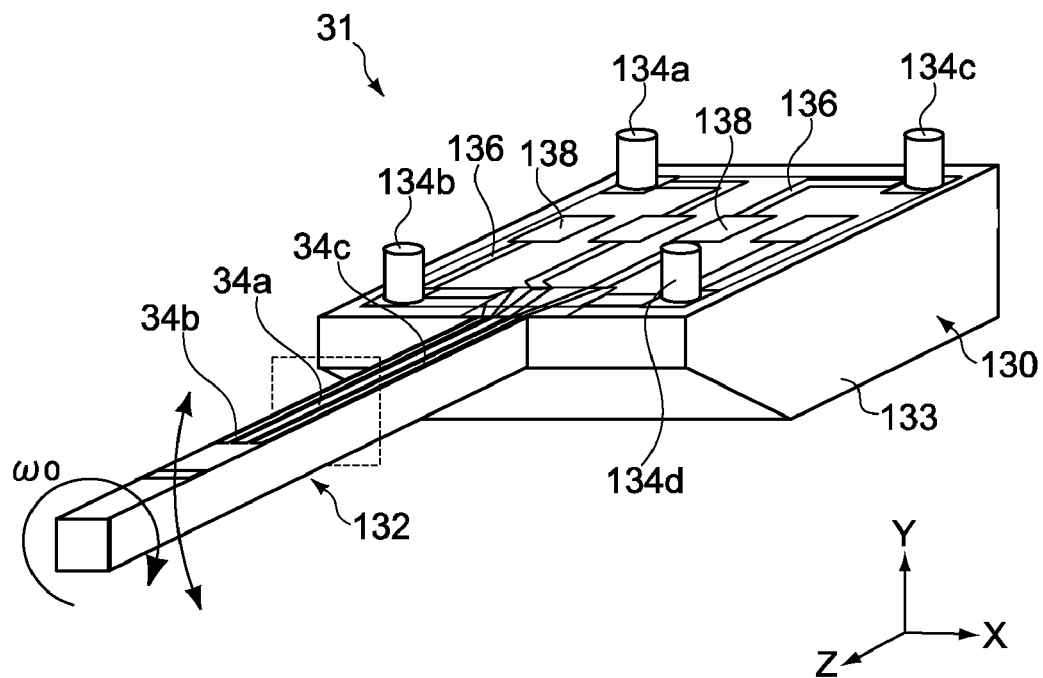
FIG. 14A is a perspective view showing a vibration element according to another embodiment of the present invention.
Figure 14B:
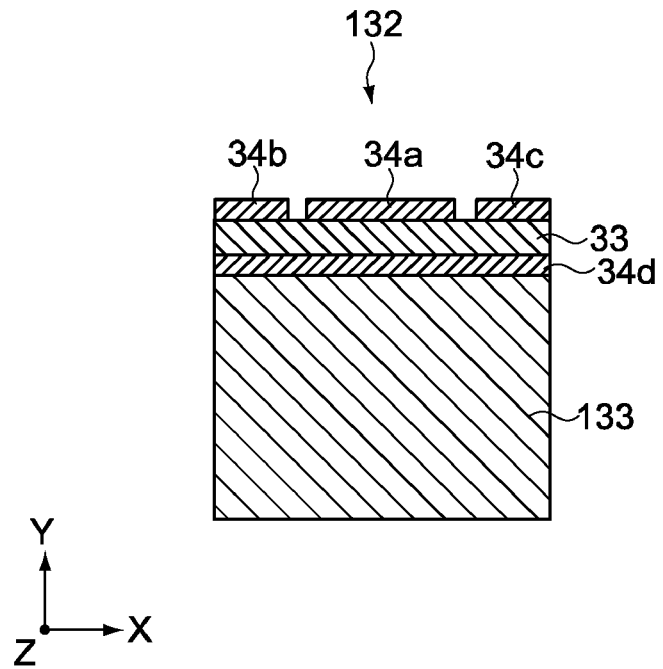
FIG. 14B is a sectional view of a surface perpendicular to a longitudinal axis of a vibration arm.

FIG. 14A is a perspective view of a vibration element according to another embodiment of the present invention. A vibration element 31 includes a base body 130 and a vibration arm 132 provided so as to extend from the base body 130. FIG. 14B is a sectional view of the vibration arm 132 showing a surface perpendicular to the longitudinal axis (Z-axis) thereof. In the description hereinbelow, descriptions on members, functions, and the like similar to those of the vibration element 21 and the vibration gyro sensor 100 according to the embodiment shown in FIGS. 8, 9, and the like will be simplified or omitted, and descriptions will be mainly given on differences.

Typically, the vibration element 31 can be produced by MEMS. As shown in FIG. 14B, for example, a conductive film 34d to be the common electrode is formed on a silicon substrate 133, and a piezoelectric film 33 is formed on the conductive film 34d. Then, a drive electrode 34a, a first detection electrode 34b, and a second detection electrode 34c having a predetermined long and thin shape are formed on the piezoelectric film 33 by a photolithography technique. The piezoelectric film 33, the drive electrode 34a, the first detection electrode 34b, and the second detection electrode 34c constitute a piezoelectric element. Specifically, the drive electrode 34a, the first detection electrode 34b, and the second detection electrode 34c are provided on the first side of the piezoelectric element and the common electrode 34d is provided on the second side opposed to the first side.

Lead electrodes including lead wires 136, electrode pads 138, and bumps 134a to 134d are formed on the base body 130. It is only necessary that the lead electrodes also be formed by the photolithography technique. The bump 134a is connected to the drive electrode 34a and the bumps 134b and 134c are connected to the first and second detection electrodes 34b and 34c, respectively. In addition, the bump 134d is connected to the common electrode 34d. The electrodes are externally connected to a control circuit such as an IC (control circuit including the circuit constituted by the blocks shown in FIG. 15) via those bumps 134a to 134d. The bumps 134a to 134d are formed of, for example, gold, copper, or aluminum, but are not limited thereto.

Upon formation of the drive electrode 34a, the first and second detection electrodes 34b and 34c, the lead wires 136, and the like as described above, a vibration element as shown in FIG. 14A is cut out from the silicon wafer.

Figure 15:
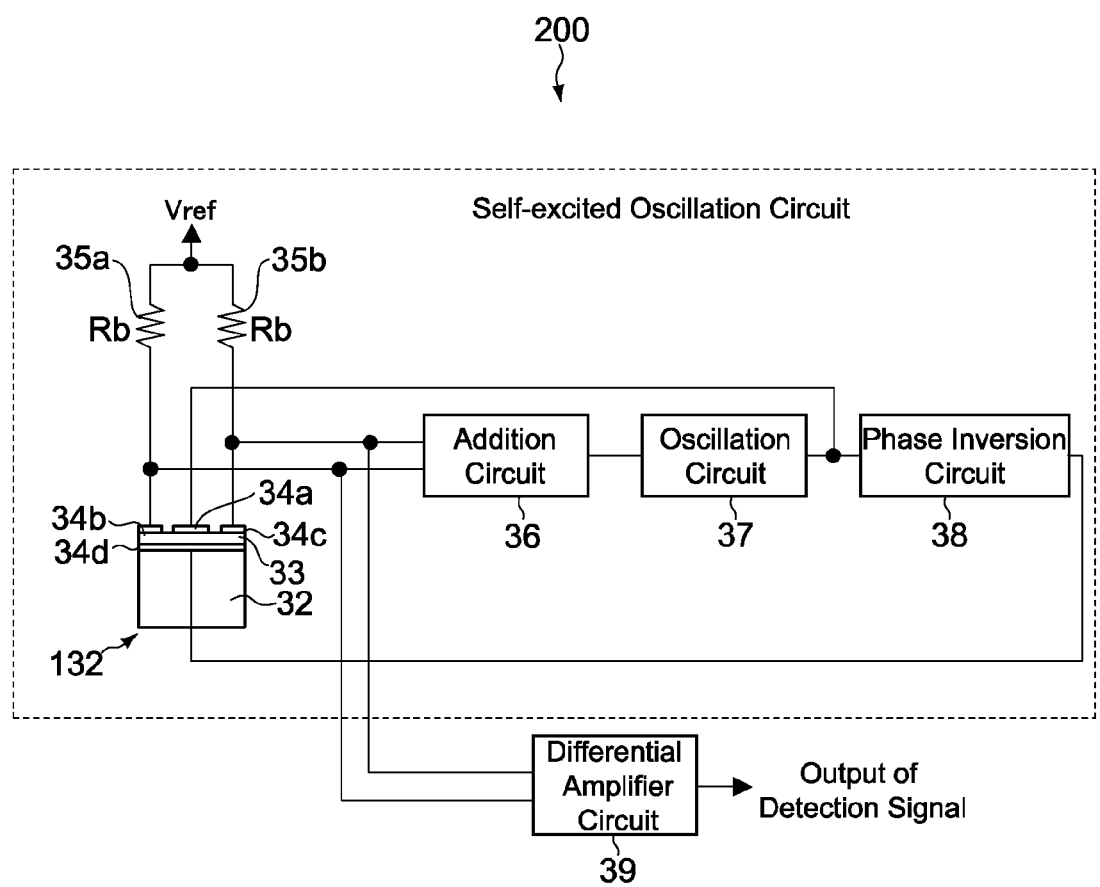
FIG. 15 is a block diagram showing a structure of a vibration gyro sensor including the vibration element shown in FIGS. 14A and 14B.

FIG. 15 is a block diagram showing a structure of the vibration gyro sensor including the vibration element 31 shown in FIGS. 14A and 14B. The structure and operation of the vibration gyro sensor 200 are the same as those of the vibration gyro sensor 100 shown in FIG. 8.

The vibration gyro sensor 200 includes an addition circuit 36, an oscillation circuit 37, a phase inversion circuit 38, a differential amplifier circuit 39, and resistors 35a and 35b. An output of the phase inversion circuit 38 is input to the common electrode 34d and an output of the oscillation circuit 37 is input to the drive electrode 34a. Also in the vibration gyro sensor 200, the first and second detection electrodes 34b and 34c not only function as the detection piece but also as the drive piece. Thus, detection sensitivity can be further improved as compared with the circuit merely provided with the phase inversion circuit, without an increase in power supply voltage, and a high S/N can therefore be realized.

Figure 16A:
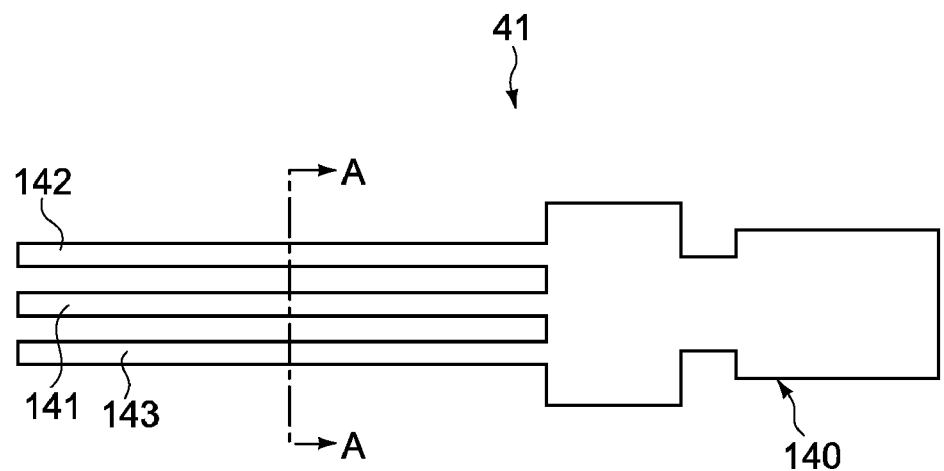
FIG. 16A is a schematic diagram showing a vibration element according to further another embodiment of the present invention.
Figure 16B:
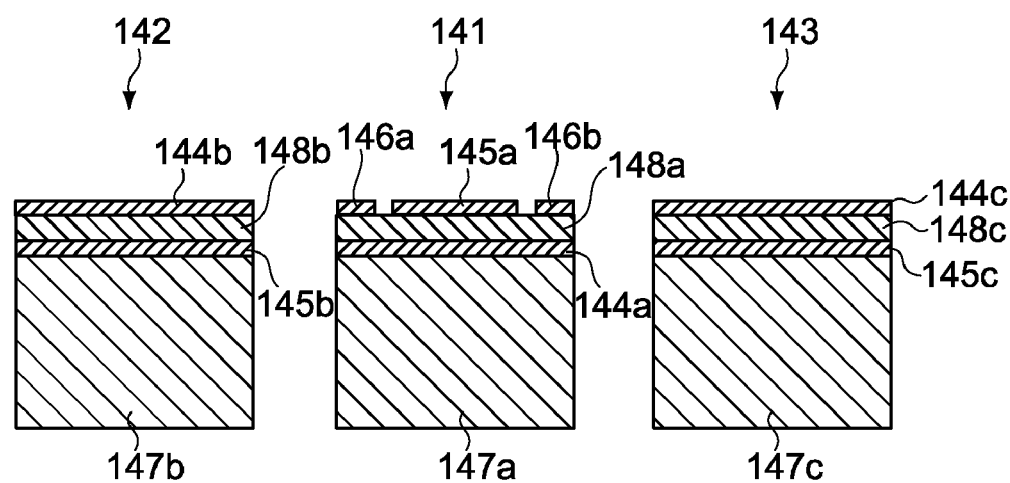
FIG. 16B is a sectional view taken along the line A-A in FIG. 16A.

FIG. 16A is a schematic diagram showing a vibration element according to yet another embodiment of the present invention. FIG. 16B is a sectional diagram taken along the line A-A of FIG. 16A.

A vibration element 41 includes a base body 140 and three vibration arms 141 to 143 provided so as to extend from the base body 140. The vibration element 41 can also be produced by MEMS, for example. As shown in FIG. 16B, the three vibration arms 141 to 143 respectively include base arms 147a to 147c made of silicon.

A piezoelectric film 148a is formed on the base arm 147a of the vibration arm 141 in the middle, and a first drive electrode 145a and first and second detection electrodes 146a and 146b are provided on a first side of the piezoelectric film 148a. In addition, a common electrode 144a is provided on a second side of the piezoelectric film 148a opposed to the first side.

A piezoelectric film 148b is formed on the base arm 147b of the vibration arm 142, and a common electrode 144b is provided on the first side of the piezoelectric film 148b. In addition, a second drive electrode 145b is provided on the second side of the piezoelectric film 148b. Similarly, a piezoelectric film 148c is formed on the base arm 147c of the vibration arm 143, and a common electrode 144c is provided on the first side of the piezoelectric film 148c. Further, a third drive electrode 145c is provided on the second side of the piezoelectric film 148c.

As in the embodiment shown in FIG. 14, the base body 140 is provided with lead electrodes (not shown).

Figure 17:
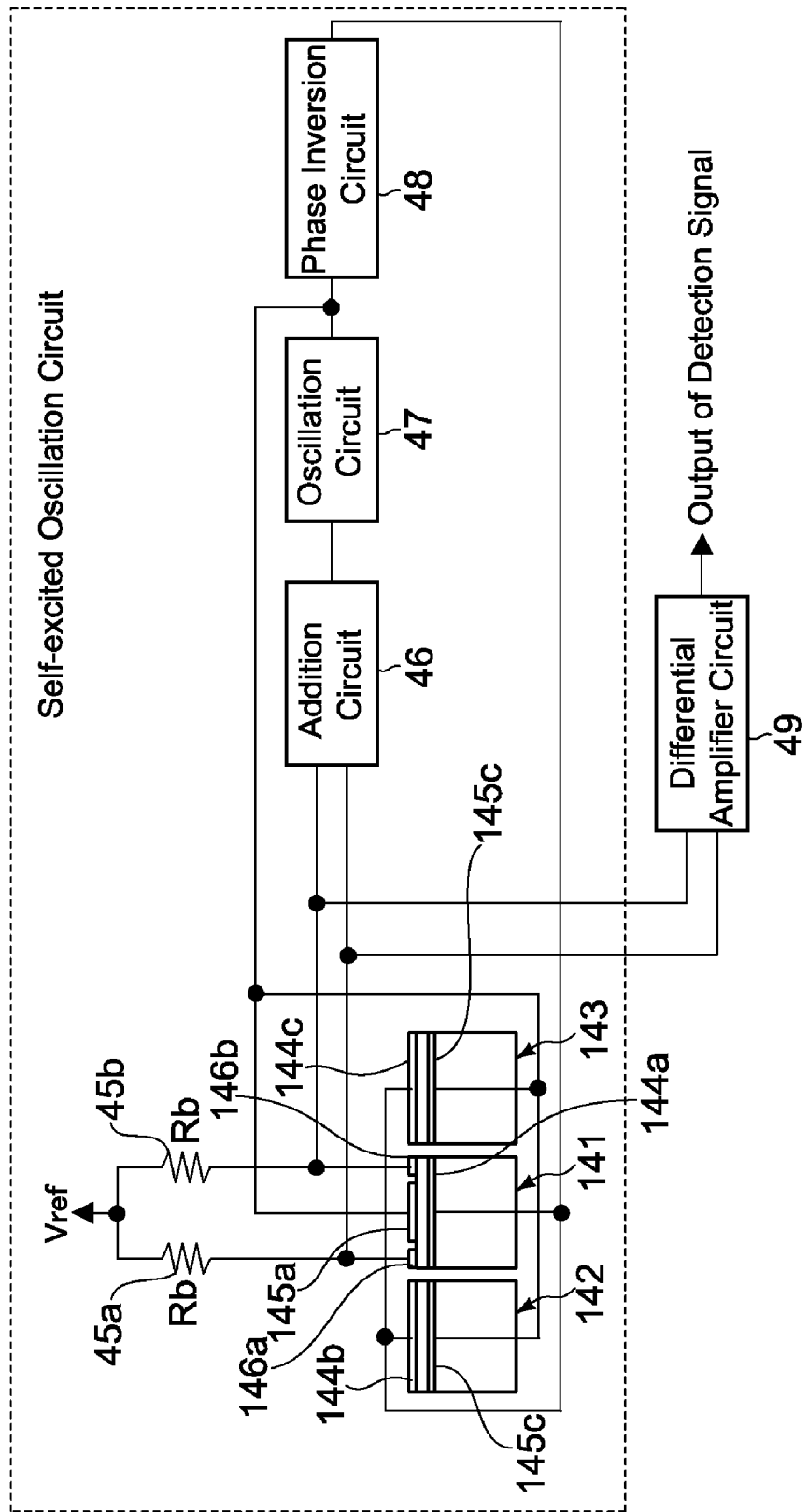
FIG. 17 is a block diagram showing a structure of a vibration gyro sensor including the vibration element shown in FIGS. 16A and 16B.

FIG. 17 is a block diagram showing a structure of a vibration gyro sensor including the vibration element 41 shown in FIGS. 16A and 16B. An output of an oscillation circuit 47 is input to the first, second, and third drive electrodes 145a, 145b, and 145c. An output of a phase inversion circuit 48 is input to the common electrodes 144a, 144b, and 144c. The first and second detection electrodes 146a and 146b are connected with resistors 45a and 45b, respectively, for applying a bias voltage Vref (common potential) to the output signals.

The vibration gyro sensor 300 structured as described above is driven so that the vibration arms 142 and 143 on both sides vibrate at the same phase and with the same amplitude and the vibration arm 141 in the middle vibrates at an inverse phase and with twice the amplitude as the vibration arms 142 and 143 on both sides. Focusing on the vibration arm 141 in the middle, because the vibration arm 141 has a structure similar to that in the embodiments shown in FIGS. 8 and 14, detection sensitivity of the first and second detection electrodes 146a and 146b can be improved without an increase in power supply voltage, and a high S/N can therefore be realized.

Note that the second and third drive electrodes 145b and 145c do not always have to be input with a drive signal. In this case, the vibration arms 142 and 143 on both sides vibrate by a rebound caused by the vibration of the vibration arm 141 in the middle.

Figure 18:
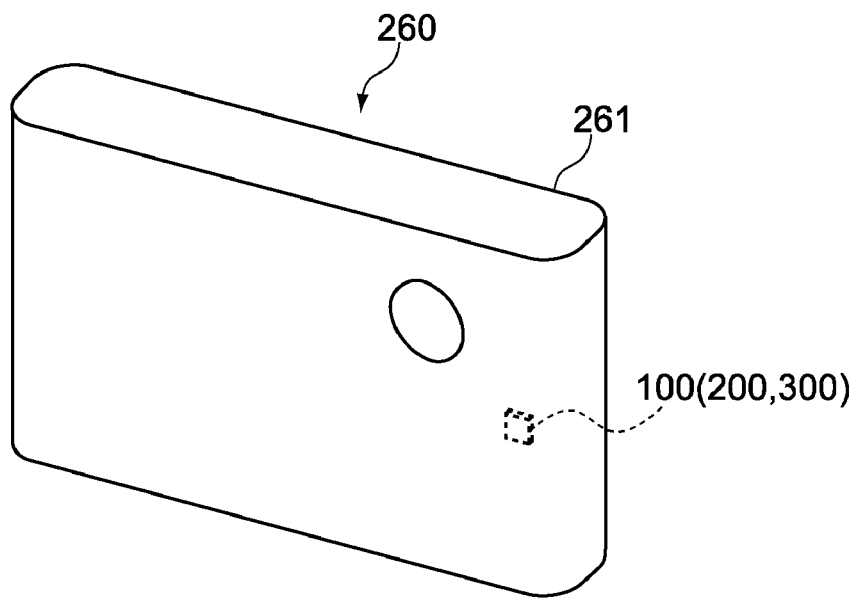
FIG. 18 is a schematic perspective view showing a digital camera as an example of an electronic apparatus mounted with the vibration gyro sensor.
Figure 19:
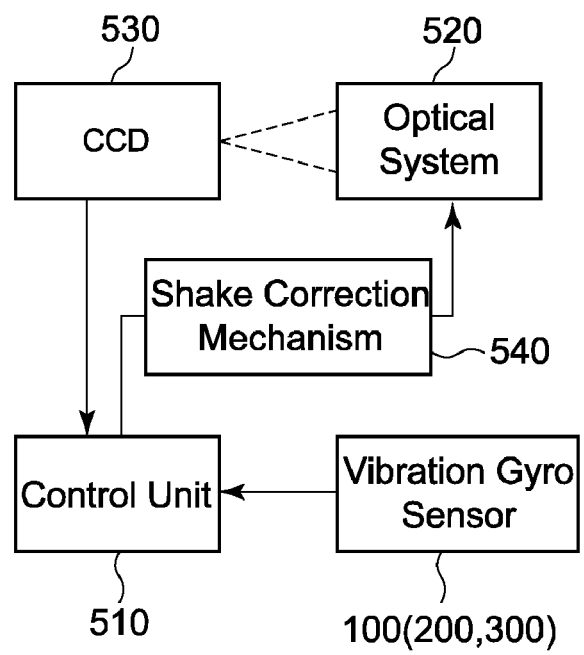
FIG. 19 is a block diagram showing a structure of the digital camera.

FIG. 18 is a schematic perspective view of a digital camera as an example of an electronic apparatus mounted with the vibration gyro sensor 100, 200, or 300. FIG. 19 is a block diagram showing a structure of the digital camera.

A digital camera 260 has a main body 261 to which the vibration gyro sensor 100 (200, 300) is mounted. The main body 261 is a frame or a casing made of, for example, metal or resin. The vibration gyro sensor 100 (200, 300) is packaged in a size of a several mm square. For detecting an angular velocity around at least to two axes, a single vibration gyro sensor 100 (200, 300) is mounted with at least two vibration elements 21 (31, 41) (see FIGS. 8, 14, and 17).

As shown in FIG. 19, the digital camera 260 includes the vibration gyro sensor 100 (200, 300), a control section 510, an optical system 520 equipped with a lens and the like, a CCD 530, and a shake correction mechanism 540 for executing shake correction with respect to the optical system 520.

Coriolis force of the two axes is detected by the vibration gyro sensor 100 (200, 300). The control section 510 uses the shake correction mechanism 540 to perform the shake correction in the optical system 520 based on the detected Coriolis force.

The embodiments of the present invention are not limited to those described above, and various other embodiments may also be employed.

The shape, size, material, and the like of the substrate, wire, and arm parts that constitute the vibration elements 21, 31, and 41 can appropriately be changed.

The electronic apparatus mounted with the vibration gyro sensor 100 (200, 300) according to the embodiments of the present invention is not limited to the digital camera. Examples of the electronic apparatus include a laptop computer, PDA (Personal Digital Assistance), electronic dictionary, audio/visual device, projector, cellular phone, game instrument, car navigation device, robot device, and other electrical appliances.

What is claimed is:

1. A vibration gyro sensor, comprising:
   a vibration element including a piezoelectric element group which has (a) a first side provided with a drive electrode and detection electrodes and (b) a second side opposed to the first side and provided with a common electrode, the vibration element vibrating due to application of a drive signal and generating an output signal containing a detection signal corresponding to Coriolis force from the detection electrodes;

bias means to apply a bias voltage to the detection electrodes;

an oscillation circuit configured to output a signal for causing vibration of the vibration element and apply the signal for causing vibration as input to the drive electrode as the drive signal based on the output signal generated by the detection electrodes; and a phase inversion circuit configured to receive input from the oscillation circuit and output an inversion signal, said inversion signal being obtained by inverting a phase of the signal output from the oscillation circuit and apply the inversion signal as input to the common electrode, wherein, the vibration element includes a base vibration body in which conductive plating is provided as an exterior surface of each side of the base vibration body, and the conductive plating is the common electrode of the piezoelectric element group.

2. The vibration gyro sensor according to claim 1, wherein the detection electrodes include a first detection electrode generating a first signal and a second detection electrode generating a second signal for obtaining the detection signal based on a difference between the first signal and the second signal, and the vibration gyro sensor further comprises an addition circuit adding the first signal obtained from the first detection electrode and the second signal obtained from the second detection electrode.

3. A vibration gyro sensor, comprising:

a vibration element including a piezoelectric element which has (a) a first side provided with a drive electrode and detection electrodes, the drive electrode being formed between the detection electrodes, and (b) a second side opposed to the first side and provided with a common electrode, the vibration element vibrating due to application of a drive signal and generating output signals containing detection signals corresponding to Coriolis force from the detection electrodes;

bias means to apply a bias voltage to the detection electrodes;

an oscillation circuit configured to output a signal for causing vibration of the vibration element and apply the signal for causing vibration as input to the drive electrode as the drive signal based on the output signals generated by the detection electrodes; and a phase inversion circuit configured to receive input from the oscillation circuit and output an inversion signal, said inversion signal being obtained by inverting a phase of the signal output from the oscillation circuit and apply the inversion signal as input to the common electrode, wherein, the common electrode is formed on a substrate of the vibration element, the substrate being on a side of the common electrode that is opposite to the piezoelectric element.

4. The vibration gyro sensor according to claim 3, wherein the vibration element includes a vibration arm to which the piezoelectric element is mounted, and a base body having a lead electrode group for external connection of the drive electrode and the detection electrodes and which supports the vibration arm.

5. A control circuit, comprising:

bias means to apply a bias voltage to detection electrodes of a vibration element, the vibration element including a piezoelectric element group which has (a) a first side provided with a drive electrode and the detection electrodes and (b) a second side opposed to the first side and provided with a common electrode, the vibration element vibrating due to application of a drive signal and generating an output signal containing a detection signal corresponding to Coriolis force from the detection electrodes;

an oscillation circuit configured to output a signal for causing vibration of the vibration element and apply the signal for causing vibration as input to the drive electrode as the drive signal based on the output signal generated by the detection electrodes; and a phase inversion circuit configured to receive input from the oscillation circuit and output an inversion signal, said inversion signal being obtained by inverting a phase of the drive signal output from the oscillation circuit and apply the inversion signal as input to the common electrode, wherein, the vibration element includes a base vibration body in which conductive plating is provided as an exterior surface of each side of the base vibration body, and the conductive plating is the common electrode of the piezoelectric element group.

6. A control circuit, comprising:

bias means to apply a bias voltage to detection electrodes of a vibration element including a piezoelectric element which has a first side provided with a drive electrode and the detection electrodes and a second side opposed to the first side and provided with a common electrode, the vibration element vibrating due to application of a drive signal and generating output signals containing detection signals corresponding to Coriolis force from the detection electrodes;

an oscillation circuit configured to output a signal for causing vibration of the vibration element and apply the signal for causing vibration as input to the drive electrode as the drive signal based on the output signals generated by the detection electrodes; and a phase inversion circuit configured to receive input from the oscillation circuit and output an inversion signal, said inversion signal being obtained by inverting a phase of the signal output from the oscillation circuit and apply the inversion signal as input to the common electrode, wherein, the common electrode is formed on a substrate of the vibration element, the substrate being on a side of the common electrode that is opposite to the piezoelectric element.

7. An electronic apparatus, comprising:

a vibration gyro sensor including:

a vibration element including a piezoelectric element group which has a first side provided with a drive electrode and detection electrodes and a second side opposed to the first side and provided with a common electrode, the vibration element vibrating by application of a drive signal and generating an output signal containing a detection signal corresponding to Coriolis force from the detection electrodes, bias means to apply a bias voltage to the detection electrodes, an oscillation circuit configured to output a signal for causing vibration of the vibration element and apply the signal for causing vibration as input to the drive electrode as the drive signal based on the output signal generated by the detection electrodes, and a phase inversion circuit configured to receive input from the oscillation circuit and output an inversion signal, said inversion signal being obtained by inverting a phase of the signal output from the oscillation circuit and apply the inversion signal as input to the common electrode; and a main body to which the vibration gyro sensor is mounted, wherein, the vibration element includes a base vibration body in which conductive plating is provided as an exterior surface of each side of the base vibration body, and the conductive plating is the common electrode of the piezoelectric element group.

* * * * *